United States Patent [19]

Henderson

[11] Patent Number: 4,482,077
[45] Date of Patent: Nov. 13, 1984

[54] PERFORATED COVER ASSEMBLY

[76] Inventor: Henning M. Henderson, 2 Club View, corner Nigel & Hills Rds., Selection Park, Springs, Transvaal Province, South Africa

[21] Appl. No.: 552,684

[22] Filed: Nov. 17, 1983

[30] Foreign Application Priority Data

Nov. 23, 1982 [ZA] South Africa .................. 82/8620
Jun. 22, 1983 [ZA] South Africa .................. 83/4553

[51] Int. Cl.³ .............................................. B65D 51/16
[52] U.S. Cl. ..................................... 220/374; 220/367; 126/299 C; 126/384
[58] Field of Search ................ 220/367, 369, 374; 126/299 C, 384, 385, 386

[56] References Cited

U.S. PATENT DOCUMENTS 2,609,960  9/1952  Irwin ..................................... 126/384
2,643,024  6/1953  Cronheim ............................. 220/367

Primary Examiner—George T. Hall
Attorney, Agent, or Firm—McAulay, Fields, Fisher, Goldstein & Nissen

[57] ABSTRACT

A perforated cover assembly is made of two oppositely dished shell members releasably interconnected at their peripheries to define a space therebetween. The lower shell member has a plurality of outlet perforations spread over substantially its entire surface and each of which is raised relative to the immediately surrounding surface of the member to prevent liquids flowing out of such perforations in use. The dished lower shell member has a central lowermost region with drainage perforations therethrough. The upper shell member has at least one large perforation and/or a plurality of small ones offset from those in the lower shell member. Preferably the upper shell member has a central funnel inlet for pouring liquids through the cover by way of the drainage perforations in the lower shell member.

14 Claims, 9 Drawing Figures

PERFORATED COVER ASSEMBLY

BACKGROUND TO THE INVENTION

THIS INVENTION relates to a perforated cover assembly adapted to define a lid to a container and, in particular, but not exclusively, to a cooking utensil such as a pot, frying pan, roasting pan or the like, in order that, in use, liquids and solids are prevented from splashing out of the container whilst gases are allowed to escape freely therefrom.

Whilst the invention is predominantly applicable to cooking utensils and a perforated cover assembly adapted to prevent fat or water, or both, from escaping from a sizzling or boiling cooking utensil, the invention extends in its application to other instances where it is desirable to prevent solids or liquids from escaping from a container. One such application is the dilution of acids.

In cooking, particularly where a frying or roasting operation is carried out, it is important that water vapour be allowed to escape from a cooking utensil whilst many people prefer it if fat or other liquids are not allowed to spat out of the utensil.

Numerous cooking accessories have been proposed heretofore with the object of achieving these desired results. One such apparatus comprises a fine mesh sieve held by a supporting peripheral frame having a handle. This sieve is supposed to prevent liquids from escaping whilst it will certainly allow gases such as water vapour to escape. In practice, however, it is often at least partly, ineffective.

In another form of cover which is available two spaced, substantially flat sheets are sealed together at their peripheries and have numerous offset perforations therethrough. The cover is intended to be usable on different sizes of pots and pans. When a small pot or pan is being covered, condensation can form in the outer regions of the cover, and drip onto the stove surrounding the pot or pan. Also, the inner surfaces of the plates cannot, in many cases, be adequately cleaned.

In at least most cases there is, furthermore, no facility for adding liquids such as water, in order to make a sauce after frying or the like, whilst retaining the cover in its operative position on a pot or pan. Many other constructions are also costly or labour intensive to manufacture and do not lend themselves to a simple mass production manufacturing technique.

It is the object of this invention to provide an improved perforated cover assembly which obviates at least some disadvantages of prior art covers.

SUMMARY OF THE INVENTION

In accordance with this invention there is provided a perforated cover assembly comprising two perforated shell members releasably held together at their peripheries to define a space therebetween and wherein one of the shell members is adapted to be uppermost in use, and the other is adapted to be lowermost in use, the operatively upper shell member having at least one perforation therethrough, and the operatively lower shell member being dished to form an operatively lower central region, having at least one drainage perforation therethough, and having a plurality of outlet perforations spread over at least a major part of the entire remaining surface area of said lower shell member, the outlet perforations each communicating with the interior of the cover assembly at a position raised with respect to the surrounding inner surface of said operatively lower shell member, the perforations in the two shell members being arranged relative to each other to inhibit the direct passage of liquids and solids through the cover assembly.

Further features of the invention provide for the outlet perforations in the lower shell member to be defined by the inner ends of short, tubular sections conveniently of roughly truncated conical shape formed in the shell member and having their axes transverse to the plane of the shell member; for the said lower central region to have oppositely directed short tubular sections defining said drainage perforations; for the shell members to each be of an oppositely dished configuration with the outer peripheries releasably connected together; and for the operatively upper shell member to embody a funnel arrangement for enabling liquids to be introduced to a container through the cover assembly by way of the drainage perforations in said lower central region.

In its most preferred form a funnel formation is provided centrally through the operatively upper shell member and aligned with a central inwardly dimpled and imperforate region of the operatively lower shell member. The peripheral ring shaped region surrounding the inwardly directed dimple defines the central lower region referred to above and has a series of outlet perforations passing therethrough.

The perforations preferably have an appreciable size when compared to those of most prior art cover assemblies and it is preferred that the diamter of the holes be between 2 mm and 10 mm and most preferably between 3 mm and 8 mm. A preferred size is about 5 mm. Such sizes of perforations provide for substantially unrestricted flow of gases or vapours from a cooking utensil on which the accessory is located.

The upper shell member need not have a plurality of perforations but could simply have a single large central perforation, large enough to accommodate the entire flow of gas through the cover assembly. The single large perforation could, where a funnel formation is provided, be defined by the stem of the funnel.

On the other hand, a plurality of offset perforation could be provided in the upper shell member, if required and, particularly if no funnel is present.

In order to prevent condensation or other liquids adhering to the inside surface of the upper shell member from running down into the peripheral join with the lower shell member, the upper shell member is preferably provided with a ridge formation extending downwardly into the lower shell member near its periphery. Condensation and liquids will thus run off the ridge into the lower shell member. Alternatively the upper shell member could be dished in the same direction, but to a lesser extent than the lower shell member.

The shell members may be made from any suitable material and, in particlar, could be of pressed aluminium or stainless steel sheets with the perforations being die cut therethrough. However, it is also within the scope of this invention to mould the shell members of a suitable heat resistant plastics material or, alternatively, a heat resistant glass material such as that sold under the Trade Name "PYREX". Glass is preferred where chemicals are to be associated with the device.

The outer peripheral shape of the assembly will be made to be complementary to that of the containers such as a cooking utensil with which it is to be used.

Thus the assembly may be circular, oval, oblong or rectangular as may be required.

Generally a circular shape will be preferred and as will become more apparent from the following, one cover assembly can be used on a wide range of different sized pots and pans without condensation dripping down outside the area of the pot or pan being covered.

The two shell members could be hinged together at one position and releasably held together at one or more angularly spaced positions but preferably, they are completely releasable from each other to facilitate cleaning and handling. Various mechanical arrangements can be employed for this purpose and some of these are described below.

BRIEF DESCRIPTION OF THE DRAWINGS

In order that the invention may be more fully understood, one embodiment thereof as applied to a perforated cover for use as a cooking lid, and having certain variations, will now be described with reference to the accompanying drawings in which.

DETAILED DESCRIPTION WITH REFERENCE TO THE DRAWINGS

Figure 1:
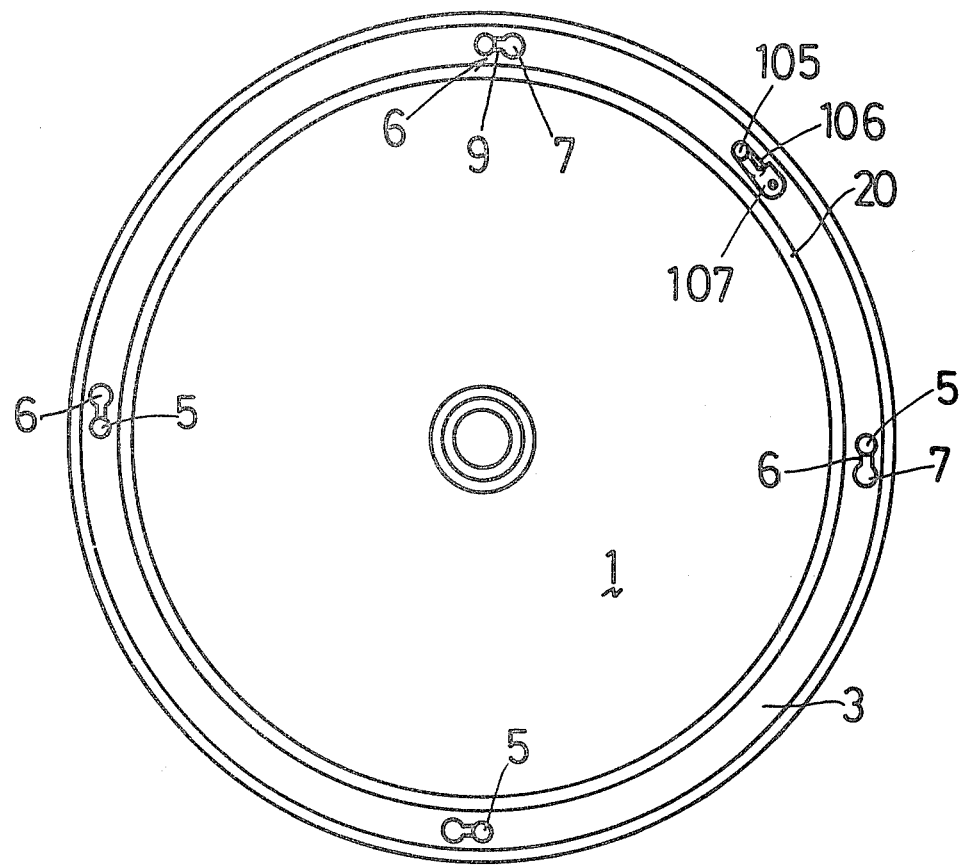
FIG. 1 is a plan view of a perforated cover assembly according to this invention.
Figure 2:
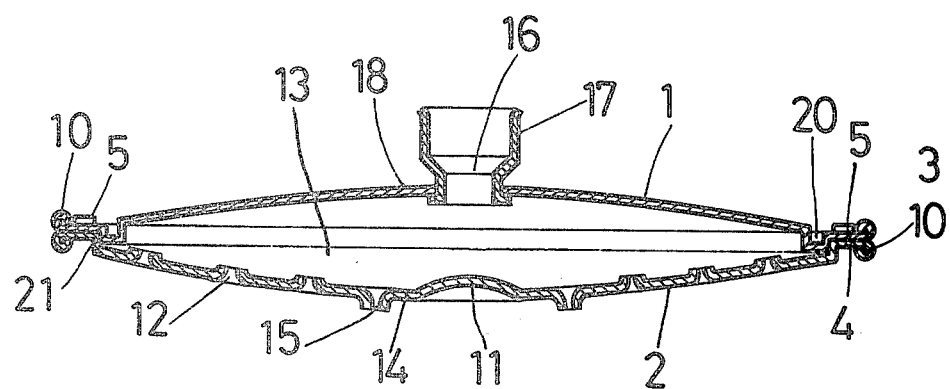
FIG. 2 is a cross-sectional elevation thereof.

In this embodiment of the invention two very shallow, dished shell members 1 and 2 are releasably interconnected at peripheral ring-shaped flat zones 3 and 4. The shape of the shell members is circular and the ring shaped flat surfaces 3 and 4 are interconnected by means of headed pins 5, themselves secured to the flat ring shaped zone 4 of the lower shell member 2. The headed pins extend through keyhole shaped slots 6 in the co-operating ring shaped zone of the upper shell member 1. Clearly the enlarged portion 7 of the keyhole shaped slots enables the head 8 of the headed pin 5 to pass therethrough whilst the adjoining slot 9 is retained by such head. To assist in aligning the headed pins and keyhole shaped slots, a plain pin 105, somewhat taller than the others co-operates with a plain circumferential slot 106. A releasable rotatable catch 107 co-operates with this pin to prevent inadvertent relative rotation of the two shell members to separate them.

In this embodiment of the invention the shell members are pressed from a stainless steel sheet metal, and in order to provide rigidity to the outer peripheral ring shaped surfaces 3 and 4, the free peripheral edge is bent over and inwardly as indicated by numeral 10. This also avoids any danger arising as a result of any exposed sharp edges of the sheet material.

The lower shell member has formed therein a central, inwardly dimpled zone 11, and a plurality of outlet perforations 12 are spread over the remainder of the surface thereof. Each of these outlet perforations is formed at the inner and upper end of a truncated conical tubular portion extending inwardly into the space 13 between the shell members. The inwardly dimpled zone 11 and the dished configuration lead to a circular trough shape 14 surrounding the dimple and forming the central lower region referred to above. A circular array of drainage perforations 15 is provided in this trough, and these are formed in similar manner to the outlet perforations, but, with the truncated tubular portions directed downwardly and outwardly from the space 13 between the two shell members. This is to enable liquids including condensation, to drain away back into a pot or pan in the central region thereof. On the other hand, the inwardly directed truncated tubular formations defining the outlet perforations prevent liquid from running out of such outlet perforations 12 which may, in some cases, be located on the outside of the periphery of a pot or pan over which the assembly is located. The dished shape guides such liquids to the trough shape and thus the drainage perforations 15.

In this embodiment of the invention the upper shell member has a single, large central outlet 16 which is defined by a funnel formation 17 communicating with the space 13 between the two shell members.

Figure 3:
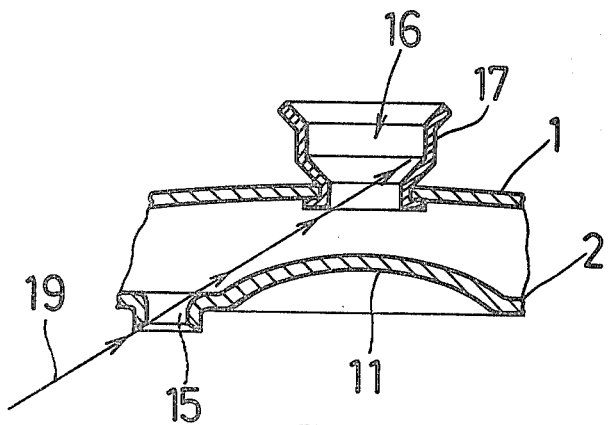
FIG. 3 illustrates a detail of the funnel co-operating with an inwardly dimpled central region of the lower shell member.
Figure 4:
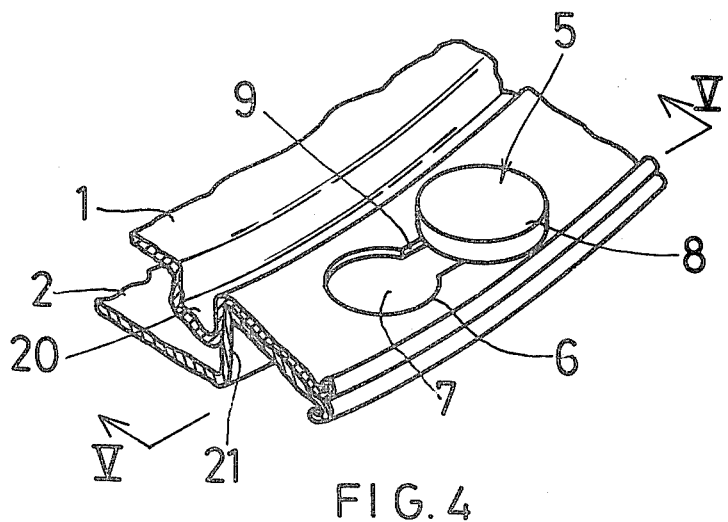
FIGS. 4 and 5 are an isometric detail and a sectional view taken along line V to V in FIG. 4 respectively, and illustrating one form of mecahnism for releasably holding the shell members together.
Figure 5:
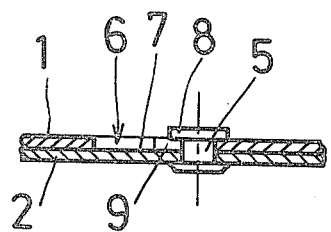

As shown more clearly in FIG. 3, the two shell members 1 and 2 are made to a sufficiently shallow dished configuration to enable the funnel to be simply attached to the shell member by bending its inner edge over the shell material, as indicated by numeral 18. In such a case, as indicated by arrows 19 in FIG. 3, no solids or liquids can pass through the drainage perforations 15 in the lower shell member and out of the funnel 17 without at least impinging on the side wall of the latter. The funnel doubles as a handle whereby the cover assembly can be lifted.

In order to ensure that any fat or other liquids which impinge on the inner surface of the upper shell member after passing through perforations in the lower shell member, run down properly into the lower shell member, and ultimately out through the drainage perforations 15 surrounding the dimple 11, a downwardly directed channel shaped formation 20 is provided near the periphery of the upper shell member. This channel shaped formation extends into the lower shell member as indicated by numeral 21. Thus, any liquids running down the inside surface of the upper shell member will drop off the channel formation 20 and will be unable to run upwardly to the co-operating surfaces of the ring shaped zones 3 and 4.

In use, the cover assembly described above can be located over a pot or pan of any size less than the maximum size thereof and larger than the diameter of the circular array of drainage perforations. When a cover assembly is thus located on a cooking utensil, liquids and solids will not be able to spat out through the cover assembly. However, liquids may be introduced into the interior of a cooking utensil on which the cover is located by way of the funnel 17 and drainage perforations. The latter also return condensation to the cooking utensil. This applies both to water and other cooking liquids. Steam and other vapours or gases can nevertheless freely escape through the outlet perforations. Cleaning of the cover assembly is achieved simply by releasing the two shell members from each other by rotating them to align the head of the pins with the enlarged portions of the keyhole shaped slots, and washing them.

It will be understood that numerous variations may be made to the above described embodiment of the invention without departing from the scope hereof. In particular the manner in which the two shell members are interconnected can be varied widely.

Figure 6:
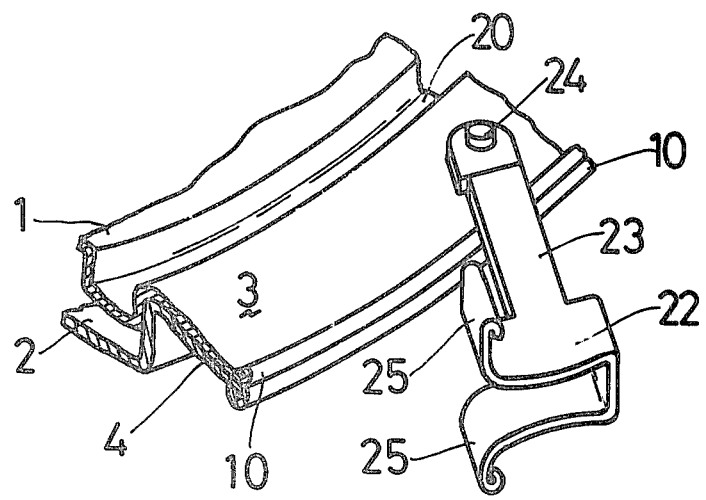
FIGS. 6 and 7 illustrate, in similar views, another such form, and, FIGS. 8 and 9 illustrate in plan view and sectional elevation, a modified embodiment of the invention.
Figure 7:
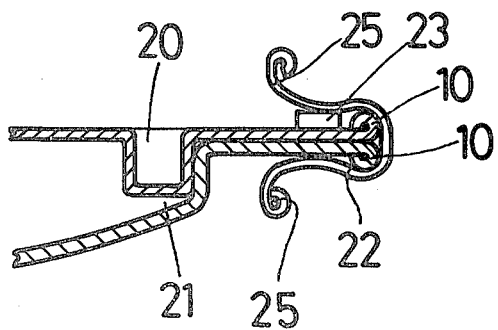

In one preferred variation illustrated in FIGS. 6 and 7, U-shaped clips 22 carried on pivotally mounted arms 23, are spaced apart about the periphery of the shell members. The arms are mounted to the upper shell member by rivets 24, acting as pivots, and are movable such that the clips can be free of the edges of the shell members (as shown in FIG. 6), or may be engaged therewith in a roughly radial direction to urge the bent edges 10 of the shell members towards each other (as shown in FIG. 7). Outwardly turned edges 25 of the free ends of the arms of the U-shaped clips act as finger engagements for releasing the clips when required.

Figure 8:
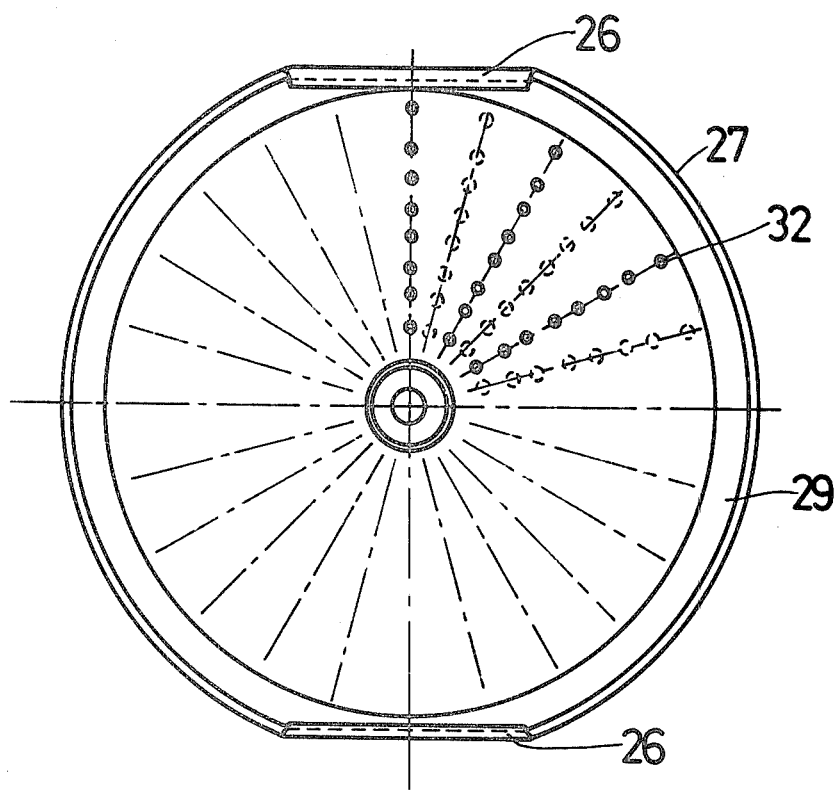
Figure 9:
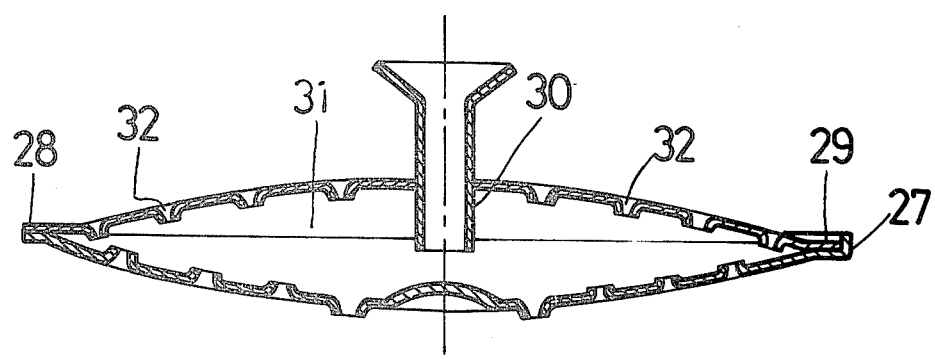

A further variation is shown in FIGS. 8 and 9 of the drawings. In this case two diammetrically opposed regions 26 of the one shell member are lipped over to provide two straight and parallel channel-shaped formations. Corresponding straight edged sections of the other shell member can be introduced therein by diametrically sliding the one relative to the other. The periphery of the lipped shell member is provided with a ridge 27 extending between the two lipped zones on the one side thereof and a flat zone 28 on the other side.

The one shell member can then be slid into the other shell member until its leading edge 29 abuts the ridge 29. In this position the two shell members will be maintained in co-operating relationship relative to each other.

In this variation a funnel having a tubular stem 30 extending into the space 31 between the shell members is provided. This enables a more pronounced dish configuration to be employed without allowing liquids or solids to spat out of the large central perforation in the upper shell member.

Also, there are illustrted, through the upper shell member, a series of perforations 32, similar to, but offset from, those in the lower shell member. The arrangement of perforations is such that no direct passage for liquids or solids through the cover assembly is provided.

It is considered that the invention will provide an extremely simple yet effective perforated cover assembly which can be made in numerous different materials according to requirements. The assembly can be cleaned properly and is therefore completely hygienic. Also there will be substantially unrestricted flow of gases through the assembly of this invention. The assembly could, as will as be appreciated from the aforegoing, be used to prevent splashing of chemicals onto a person's clothes and, in particular, in chemical laboratories.

What I claim as new and desire to secure by letters patent is:

1. A perforated cover assembly comprising two perforated shell members releasably held together at their peripheries to define a space therebetween and wherein one of the shell members is adapted to be uppermost in use, and the other is adapted to be lowermost in use, the operatively upper shell member having at least one perforation therethrough, and the operatively lower shell member being dished to form an operatively lower central region, having at least one drainage perforation therethough, and having a plurality of outlet perforations spread over at least a major part of the remaining surface area thereof, the outlet perforations each communicating with the interior of the cover assembly at a position raised with respect to the surrounding inner surface of said operatively lower shell member, the perforations in the two shell members being arranged relative to each other to obstruct the direct passage of liquids and solids through the cover assembly.

2. A perforated cover assembly as claimed in claim 1 in which the outlet perforations in the lower shell member are defined by the inner ends of short, tubular sections formed in the shell member.

3. A perforated cover assembly as claimed in claim 2 in which the tubular sections are of roughly truncated conical shape.

4. A perforated cover assembly as claimed in claim 1 in which the drainage perforations are defined at the ends of outwardly directed short tubular sections formed in the shell member.

5. A perforated cover assembly as claimed in claim 1 in which the said lower central region of the operatively lower shell member is in the form of a circular trough surrounding an inwardly directed central dimple formation.

6. A perforated cover assembly as claimed in claim 5 in which drainage perforations form a circular array thereof in the trough.

7. A perforated cover assembly as claimed in claim 1 in which the upper shell member has a central perforation therethrough.

8. A perforated cover assembly as claimed in claim 7 in which the central perforation is the only perforation through the upper shell member and is large enough to accommodate the flow through all perforations in the lower shell member.

9. A perforated cover assembly as claimed in claim 1 in which a funnel is provided in the upper shell member for introducing liquids through the cover assembly by way of the drainage perforations.

10. A perforated cover assembly as claimed in claim 1 in which the upper shell member is oppositely dished and has at its outer region a ridge extending downwardly into the lower shell member for directing liquids into the latter.

11. A perforated cover assembly as claimed in claim 1 in which the upper shell member is provided with a plurality of perforations similar to those in the lower shell member but offset therefrom.

12. A perforated cover assembly as claimed in claim 1 in which the shell members are releasably held together at peripheral, flat ring-shaped zones.

13. A perforated cover assembly as claimed in claim 12 in which the shell members are held together by a plurality of spaced headed pins carried on one of the ring shaped zones co-operating with keyhole shaped, circumferentially extending slots in the ring shaped zone of the other member, the shell members being rotatable between positions in which the heads can pass through the enlarged portion of the keyhole shaped slots and a position in which the head co-operates with the narrow portions of the slots to retain the members together.

14. A perforated cover assembly as claimed in claim 12 in which there are provided a plurality of spaced U-shaped clips for releasably clipping the peripheries of the shell members together, the clips being carried on pivotally mounted arms movable between positions in which the clips are inoperative and operative positions thereof.

* * * * *